United States Patent [19]

Shaffer

[11] Patent Number: 5,606,001
[45] Date of Patent: Feb. 25, 1997

[54] POLYISOCYANATES CONTAINING ALLOPHANATE GROUPS AND OPTIONALLY ISOCYANURATE GROUPS

[75] Inventor: Myron W. Shaffer, New Cumberland, W. Va.

[73] Assignee: Bayer Corporation, Pittsburgh, Pa.

[21] Appl. No.: 527,913

[22] Filed: Sep. 14, 1995

[51] Int. Cl.$^6$ .................................................. C08G 18/10
[52] U.S. Cl. ........................... 528/49; 528/59; 252/182.2; 560/336; 560/352; 560/354; 560/355
[58] Field of Search .......................... 252/182.2; 528/49, 528/59; 560/336, 352, 354, 355

[56] References Cited

U.S. PATENT DOCUMENTS

| | | | |
|---|---|---|---|
| 3,769,318 | 10/1973 | Windemuth et al. | 260/471 C |
| 4,160,080 | 7/1979 | König et al. | 528/59 |
| 4,177,342 | 12/1979 | Bock et al. | 528/45 |
| 4,738,991 | 4/1988 | Narayan | 521/124 |
| 5,124,427 | 6/1992 | Potter et al. | 528/67 |
| 5,208,334 | 5/1993 | Potter et al. | 544/193 |
| 5,235,018 | 8/1993 | Potter et al. | 528/49 |
| 5,290,902 | 3/1994 | Jacobs et al. | 528/49 |
| 5,319,054 | 6/1994 | Slack et al. | 528/48 |
| 5,444,146 | 8/1995 | Potter et al. | 528/49 |

*Primary Examiner*—Rachel Gorr
*Attorney, Agent, or Firm*—Joseph C. Gil; Thomas W. Roy

[57] ABSTRACT

The present invention relates to a polyisocyanates containing allophanate groups and optionally isocyanurate groups that are prepared by reacting compounds which i) are substantially free of hydroxyl groups and isocyanate groups, ii) have an average of at least two urethane groups per molecule and iii) are the reaction products of linear or branched, aliphatic isocyanates with organic hydroxyl compounds, with an excess quantity, based on the urethane groups, of 4,4'-bis-(isocyanatocyclohexyl)-methane to form polyisocyanates containing allophanate groups and optionally isocyanurate groups and optionally removing at least a portion of the unreacted excess 4,4'-bis-(isocyanatocyclohexyl)-methane. The present invention also relates to a process for the production of these polyisocyanates and to their use as binders or binder components in coating compositions.

17 Claims, No Drawings

5,606,001

POLYISOCYANATES CONTAINING ALLOPHANATE GROUPS AND OPTIONALLY ISOCYANURATE GROUPS

BACKGROUND OF THE INVENTION

1. Field of the Invention

The present invention relates to polyisocyanates containing allophanate groups and optionally isocyanurate groups, to a process for preparing these polyisocyanates and to their use as binders or binder components in coating compositions.

2. Description of the Prior Art

Polyisocyanates containing allophanate groups and their use as the isocyanate component in coating compositions is known and described in U.S. Pat. Nos. 4,160,080 and 4,177,342 and 4,738,991. Polyisocyanates containing allophanate groups and isocyanurate groups are known and disclosed in U.S. Pat. Nos. 5,124,427, 5,208,334, 5,235,018, 5,290,902 and 5,444,146. The preparation of these polyisocyanates is generally carried out by reacting excess quantities of preferably aliphatic or cycloaliphatic diisocyanates with monohydric or polyhydric alcohols in the presence of a catalyst that promotes the formation of allophanate groups or a catalyst that promotes the formation of both allophanate and isocyanurate groups. After the reactions are complete, the excess unreacted monomeric diisocyanates are removed by distillation and products are formed having properties which can be varied widely depending upon the diisocyanate used.

The preparation of polyisocyanates containing allophanate groups from aromatic diisocyanates is described in U.S. Pat. No. 3,769,318. One of the disadvantages of these aromatic allophanate polyisocyanates is their poor heat stability. During thin-film distillation the allophanate polyisocyanates regenerate the incorporated diisocyanates making it impossible to completely separate the excess diisocyanate following the allophanatization reaction.

With regard to allophanate polyisocyanates based on 4,4'-bis-(isocyanatocyclohexyl)-methane (HMDI), it is possible to separate the excess diisocyanate down to acceptable levels. However, just because the decomposition of the allophanate polyisocyanates may occur at a slower rate, such that it is possible to remove monomer, does not mean that the resulting polyisocyanates are heat stable. Any decomposition of the allophanate polyisocyanates is disadvantageous because it affects the yield, increases the amount of monomer that must be removed and also results in the presence of urethane group-containing compounds in the final product. When the allophanate polyisocyanates are prepared from monofunctional alcohols, the urethane group-containing compounds are monoisocyanates, which is even more disadvantageous because they act as chain terminators when the polyisocyanates are subsequently used for the production of coatings.

Accordingly, it is an object of the present invention to provide thermally stable polyisocyanates, which contain allophanate groups and are based on HMDI.

This object may be achieved in accordance with the present invention, which is described in more detail below. In accordance with the present invention the polyisocyanates containing allophanate groups are prepared by using different isocyanate components for the urethanization and the subsequent allophanatization and optional trimerization reactions.

SUMMARY OF THE INVENTION

The present invention relates to polyisocyanates containing allophanate groups and optionally isocyanurate groups that are prepared by reacting compounds which i) are substantially free of hydroxyl groups and isocyanate groups, ii) have an average of at least two urethane groups per molecule and iii) are the reaction product of linear or branched, aliphatic isocyanates with organic hydroxyl compounds, with an excess quantity, based on the urethane groups, of 4,4'-bis-(isocyanatocyclohexyl)-methane to form polyisocyanates containing allophanate groups and optionally isocyanurate groups and optionally removing at least a portion of the unreacted excess 4,4'-bis-(isocyanatocyclohexyl)-methane.

The present invention also relates to a process for preparing these polyisocyanates containing allophanate groups by reacting compounds which i) are substantially free of hydroxyl groups and isocyanate groups, ii) have an average of at least two urethane groups per molecule and iii) are the reaction product of linear or branched, aliphatic isocyanates with organic hydroxyl compounds, with an excess quantity, based on the urethane groups, of bis-(4-isocyanatocyclohexyl)-methane to form polyisocyanates containing allophanate groups and optionally isocyanurate groups and optionally removing at least a portion of the unreacted excess bis-(4-isocyanato-cyclohexyl)-methane.

Finally, the present invention also relates to the use of these polyisocyanates as binders or binder components in coating compositions.

DETAILED DESCRIPTION OF THE INVENTION

Starting materials for the process according to the invention are compounds containing urethane groups and bis-(4-isocyanatocyclohexyl)-methane (HMDI), which are reacted together to form polyisocyanates containing allophanate groups and optionally isocyanurate groups.

The compounds containing urethane groups have an average of at least two urethane groups per molecule and a number average molecular weight, which may be calculated from the stoichiometry of the starting materials, of less than 1,500, preferably less than 1000 and more preferably less than 500. The compounds are substantially free of isocyanate groups and hydroxyl groups, i.e., the NCO content of compounds a) is less than 2 wt. %, preferably less than 0.5 wt. % and more preferably less than 0.2 wt. % and the hydroxyl group content is less than 1 wt. %, preferably less than 0.3 wt. % and more preferably less than 0.1 wt. %. This objective may be achieved during the preparation of these compounds by reacting the starting components at an NCO/OH equivalent ratio of 1.2:1 to 1:1.2, preferably of 1.1:1 to 1:1.1 and more preferably 1:1. The reaction to form urethane groups is generally carried out at a temperature of 20° to 130° C., preferably 50° to 90° C. The reaction is preferably carried out in the melt, although suitable organic solvents may be used.

The isocyanates used for the production of the compounds containing urethane groups are selected from linear or branched aliphatic mono-, di- and/or polyisocyanates having a molecular weight of 99 to 400, preferably 140 to 300, and an NCO content of 10 to 60 wt. %, preferably 18 to 60 wt. % and more preferably 30 to 50 wt. %. The average NCO functionality of these isocyanates is 1 to 3, preferably 1 to 2 and more preferably 2.

Examples of monoisocyanates, which may used alone or in admixture with diisocyanates to prepare the compounds containing urethane groups, include aliphatic monoisocyanates having 4 to 18 carbon atoms such as n-butyl isocyanate or n-hexyl isocyanate.

Examples of suitable diisocyanates include 1,4-tetramethylene diisocyanate, 1,5-pentamethylene diisocyanate, 1,6-hexamethylene diisocyanate (HDI), 2,2,4-trimethyl-1,6-hexamethylene diisocyanate, 1,11-undecamethytene diisocyanate and 1,12-dodecamethylene diisocyanate. 1,6-hexamethylene diisocyanate is preferred. Also suitable are polyisocyanates such as 4-isocyanantomethyl-1,8-octamethylene diisocyanate.

Derivatives of the preceding isocyanates containing biuret groups, uretdione groups, isocyanurate groups or carbodiimide groups are also suitable for preparing the compounds containing urethane groups, but are not preferred.

Suitable alcohols for preparing the compounds containing urethane groups are selected from monohydric to hexahydric alcohols having a molecular weight 32 to 900, preferably 74 to 300, and mixtures of these alcohols. Examples of suitable monohydric alcohols include saturated monohydric alcohols such as methanol, ethanol, n-propanol, isopropanol, methoxypropanol and the isomeric butanols, pentanols, hexanols, octanols, decanols, dodecanols and octadecanols. Examples of polyhydric alcohols include ethylene glycol, propylene glycol, butanediol-1,4, hexanediol-1,6, neopentyl glycol, 2-methylpropanediol-1,3, 2,2,4-trimethylpentanediol-1,3, dimeric fatty alcohols, trimeric fatty alcohols, glycerol, trimethylolpropane, trimethylolethane, the isomeric hexanetriols, pentaerythritol and sorbitol. Also suitable are unsaturated alcohols such as allyl alcohol, trimethylolpropane diallyl ether, butenediol and monofunctional alcohols that are derived from corresponding acids or acidic mixtures of unsaturated synthetic and naturally-occurring fatty acids.

Also suitable, but not preferred, are alkoxylation products containing ether groups of the monohydric and polyhydric alcohols previously set forth and/or transesterification products containing hydroxyl groups of fats or oils with polyhydric alcohols, in particular glycerol, trimethylolpropane or pentaerythritol.

Preferably, the alcohol component is a monohydric alcohol, more preferably a monohydric alcohol containing 1 to 10 carbon atoms and most preferably a monohydric alcohol containing 3 to 8 carbon atoms.

The molecular weight of the compound containing urethane groups is adjusted by suitable selection of the isocyanate and alcohol components and, in particular, by their average functionality. Since high molecular weight, urethane group-containing compounds are not suitable in accordance with the present invention at least a portion of the isocyanate and/or alcohol component is made up of monofunctional components to bring about chain termination during the reaction to form urethane groups. This means that the average functionality of the isocyanate and alcohol components is less than 2.

It is also possible in accordance with the present invention to use urethane group-containing compounds prepared by other methods such as the known "phosgene-free urethane synthesis" described, for example, in EP-A-0,027,940, EP-A-0,027,952, EP-A-0,027,953, EP-A-0,323,514 and EP-A-0,355,443.

After preparation of the compounds containing urethane groups, they are reacted with 4,4'-bis-(isocyanatocyclohexyl)-methane (HMDI). In accordance with the present invention HMDI also includes mixtures of 4,4'-bis-(isocyanatocyclohexyl)-methane with its 2,4'- and/or 2,2'-isomers.

The reaction of the urethane group-containing compound with HMDI is carried out at an NCO/urethane equivalent ratio of 3:1 to 100:1, preferably 6:1 to 60:1 and more preferably 8:1 to 30:1, and at a temperature of 50° C. to 250° C., preferably 60° C. to 150° C. and more preferably 70° C. to 120° C. Suitable methods for preparing allophanate group containing polyisocyanates are known and described in U.S. Pat. Nos. 3,769,318, 4,160,080 and 4,177,342 and 4,738,991, the disclosures of which are herein incorporated by reference.

The allophanatization of the starting diisocyanate mixture may be carried out in the absence or in the presence of solvents which are inert to isocyanate groups. Depending on the area of application of the products according to the invention, low to medium-boiling solvents or high-boiling solvents can be used. Suitable solvents include esters such as ethyl acetate or butyl acetate; ketones such as acetone or butanone; aromatic compounds such as toluene or xylene; halogenated hydrocarbons such as methylene chloride and trichloroethylene; ethers such as diisopropylether; and alkanes such as cyclohexane, petroleum ether or ligroin.

Instead of using catalysts that promote the formation of allophanate groups, it is also possible in accordance with the present invention to also use catalysts that promote the formation of isocyanurate groups, or to use catalysts that promote the formation of allophanate groups and isocyanurate groups. Suitable methods and catalysts for the preparation of polyisocyanates containing isocyanurate groups and allophanate groups are known and described in U.S. Pat. Nos. 5,124,427, 5,208,334, 5,235,018, 5,290,902 and 5,444,146, the disclosures of which are herein incorporated by reference. The trimerization of the starting diisocyanate mixture may be carried out in the absence or in the presence of solvents which are inert to isocyanate groups, such as those previously described.

Examples of suitable catalysts include tetraalkylammonium hydroxides or arylalkylammonium hydroxides; metal salts such as iron(III) chloride or potassium octoate; zinc compounds such as zinc stearate, zinc octoate, zinc naphthenate or zinc acetylacetonate; tin compounds such as tin(II) octoate, tin(II) ethyl-hexanoate, tin(II)laurate, dibutyltin oxide, dibutyltin dichloride, dibutyltin diacetate, dibutyltin dilaurate, dibutyltin maleate or dioctyltin diacetate; aluminum tri(ethyl acetoacetate); and compounds of manganese, cobalt or nickel and mineral acids such as trifluoroacetic acid, sulphuric acid, hydrogen chloride, hydrogen bromide, phosphoric acid or perchloric acid.

The catalysts can be added prior to the allophanatization reaction or even prior to the urethanization. They are used in concentrations of 0.001 to 5 wt. %, preferably 0.005 to 1 wt. %. At a temperature of about 50° C. and in the presence of the required catalyst or catalyst solution the allophanatization reaction begins and is indicated by an exothermic reaction. When catalysts for the formation of allophanate groups and isocyanurate groups are present, it is possible to control the rate of formation of these two groups. As the reaction temperature increases the conversion rate of urethane groups to allophanate groups increases faster than the formation of isocyanurate groups. Accordingly, by varying the reaction temperature, it is possible to obtain different ratios of allophanate groups to isocyanurate groups.

The progress of the reaction is followed by determining the NCO content by a suitable method such as titration, refractive index or IR analysis. Thus, the reaction may be allowed to proceed to completion or it may be terminated at the desired degree of allophanatization. The termination of the allophanatization reaction can take place, for example, after the NCO content has fallen by 5 to 80% by weight, preferably 10 to 60% by weight and more preferably 20 to 50% by weight, based on the initial isocyanate group content of the diisocyanate starting material.

The termination of the allophanatization and optionally trimerization reactions can take place, for example, by the addition of a catalyst poison of the type named by way of example in the above-mentioned literature references. For example, when using basic catalysts the reaction is terminated by the addition of a quantity, which is at least equivalent to the catalyst quantity, of an acid chloride such as benzoyl chloride. When using heat-labile catalysts, for example, certain quaternary ammonium hydroxides, poisoning of the catalyst by the addition of a catalyst-poison may be dispensed with, since these catalysts decompose in the course of the reaction. The use of suspended catalysts is also possible. These catalysts are removed after achieving the desired degree of trimerization by filtering the reaction mixture.

The working-up of the reaction mixture, optionally after previous separation of insoluble catalyst constituents, may take place in various ways depending upon how the reaction was conducted and the area of application for the isocyanates. Any solvent used during the reaction and any unreacted monomer present in the polyisocyanate product may optionally be removed, e.g, by distillation, in known manner. The product obtained after the optional distillation step or after the reaction is allowed to proceed to completion generally contains a total of less than 2% by weight, preferably less than 1% by weight, more preferably less than 0.5% by weight and most preferably less than 0.2% by weight, based on the solids content of the polyisocyanate mixture, of free (unreacted) HMDI. The products according to the invention are polyisocyanates containing allophanate groups and optionally isocyanurate groups, which have an NCO content from 5 to 30 wt. %, preferably 5 to 15 wt. %, have an average functionality of 2 to 4 and are viscous to resinous products.

The polyisocyanate mixtures have an allophanate group content (calculated as $N_2$, $C_2$, $H$,$O_3$, MW 101) of at least 5%, preferably at least 10% by weight. The upper limit for the allophanate group content is 35%, preferably 30% by weight. The polyisocyanate mixtures have an isocyanurate group content (calculated as $N_3$, $C_3$, $O_3$, MW 126) of up to 25% by weight, preferably up to 20% by weight. When using allophanatization/trimerization catalysts, the polyisocyanate mixtures will generally have an isocyanurate group content of at least 5%, preferably at least 10% by weight. Even when using highly selective allophanatization catalysts, minor quantities of isocyanurate groups are formed.

Depending on the viscosity of the products according to the invention, it may be useful to dilute them with inert solvents. Suitable solvents include those previously set forth for the production of the compounds containing allophanate and optionally isocyanurate groups.

The products according to the invention are valuable starting materials for the production of polyisocyanate polyaddition products by reaction with compounds containing at least two isocyanate reactive groups. The products according to the invention may also be moisture-cured to form coatings. Preferred products are one or two-component coating compositions, more preferably polyurethane coating compositions. When the polyisocyanates are unblocked, two-component compositions are obtained. To the contrary when the polyisocyanates are blocked, one-component compositions are obtained.

Preferred reaction partners for the products according to the invention are the polyhydroxy polyesters, polyhydroxy polyethers, polyhydroxy polyacrylates, polyhydroxy polylactones, polyhydroxy polyurethanes, polyhydroxy polyepoxides and optionally low molecular weight, polyhydric alcohols known from polyurethane coatings technology. Polyamines, particularly in blocked form, for example as polyketimines, oxazolidines or polyaldimines are also suitable reaction partners for the products according to the invention. Also suitable are polyaspartic acid derivatives (succinates) containing secondary amino groups, which also function as reactive diluents.

To prepare the coating compositions the amount of the polyisocyanate component and the isocyanate reactive component are selected to provide equivalent ratios of isocyanate groups (whether present in blocked or unblocked form) to isocyanate-reactive groups of about 0.8 to 3, preferably about 0.9 to 1.5.

To accelerate hardening, the coating compositions may contain known polyurethane catalysts, e.g., tertiary amines such as triethylamine, pyridine, methyl pyridine, benzyl dimethylamine, N,N-dimethylamino cyclohexane, N-methyl-piperidine, pentamethyl diethylene triamine, 1,4-diazabicyclo[2,2,2]-octane and N,N'-dimethyl piperazine; or metal salts such as iron(III)-chloride, zinc chloride, zinc-2-ethyl caproate, tin(II)-ethyl caproate, dibutyltin(IV)-dilaurate and molybdenum glycolate.

The products according to the invention are also valuable starting materials for one-component coating compositions, preferably polyurethane coating compositions, in which the isocyanate groups are used in a form blocked by known blocking agents. The blocking reaction is carried out in known manner by reacting the isocyanate groups with suitable blocking agents, preferably at an elevated temperature (e.g. about 40° to 160° C.), and optionally in the presence of a suitable catalyst, for example, the previously described tertiary amines or metal salts.

Suitable blocking agents include monophenols such as phenol, the cresols, the trimethylphenols and the tert. butyl phenols; tertiary alcohols such as tert. butanol, tert. amyl alcohol and dimethylphenyl carbinol; compounds which easily form enols such as acetoacetic ester, acetyl acetone and malonic acid derivatives, e.g. malonic acid diethylester; secondary aromatic amines such as N-methyl aniline, the N-methyl toluidine, N-phenyl toluidine and N-phenyl xylidine; imides such as succinimide; lactams such as s-caprolactam and δ-valerolactam; pyrazoles such as 3,5-dimethyl pyrazole; oximes such as butanone oxime, methyl amyl ketoxime and cyclohexanone oxime; mercaptans such as methyl mercaptan, ethyl mercaptan, butyl mercaptan, 2-mercaptobenzthiazole, α-naphthyl mercaptan and dodecyl mercaptan; and triazoles such as 1H-1,2,4-triazole.

The polyisocyanate mixtures according to the invention may also be used as the polyisocyanate component in two-component water borne coating compositions. To be useful for in these compositions the polyisocyanate mixtures must be rendered hydrophilic either by blending with external emulsifiers or by a reaction with compounds containing cationic, anionic or non-ionic groups. Methods for rendering the polyisocyanates hydrophilic are disclosed in copending application, U.S. Pat. Nos. 5,194,487 and 5,200,489, the disclosures of which are herein incorporated by reference. The reduced surface tension of the modified polyisocyanate mixtures enhance pigment dispersion and substrate wetting.

The coating compositions may also contain other additives such as pigments, dyes, fillers, levelling agents and solvents. The coating compositions may be applied to the substrate to be coated in solution or from the melt by conventional methods such as painting, rolling, pouring or spraying.

The coating compositions containing the polyisocyanates according to the invention provide coatings which have good dry times, adhere well to a metallic base, and are particularly light-fast, color-stable in the presence of heat and very resistant to abrasion. Furthermore, they are characterized by high hardness, elasticity, very good resistance to chemicals, high gloss, good weather resistance, good environmental etch resistance and good pigmenting qualities. Above all, the coating compositions have an excellent surface appearance and excellent cleanability.

The invention is further illustrated, but is not intended to be limited by the following examples in which all parts and percentages are by weight unless otherwise specified.

EXAMPLES

Example 1—Comparison

In a flask equipped with a mechanical stirrer, thermocouple, sparging tube, and dropping funnel 300 g (2.29 eq) of HMDI (Desmodur W, available from Bayer Corporation) and 11.3 g (0.153 eq) of n-butanol were heated to 90° C. under a nitrogen sparge to complete urethanization. After cooling to 60° C., 0.8 g of a 10% catalyst solution of trimethylbenzylammonium hydroxide (100 ppm) in n-butanol was added dropwise via syringe to the stirred reaction mixture. The reaction was stopped with 0.8 g of a 20% solution of dibutylphosphate in HDI. The allophanatization/trimerization reaction was stopped at 36% conversion of the isocyanate groups. The crude product had an NCO content of 24.05% and a viscosity of 2950 mPa.s at 25° C.

Excess HMDI monomer was removed from the crude product via thin film evaporation at 200° C. and 100 mTorr. The resulting product, which was reduced to 70% solids in Aromatic 100 solvent, had a viscosity of 1600 cps at 25° C., an NCO content of 9.16% and a monomer content of 0.42%.

Example 2—According to the Invention

In a flask equipped with a mechanical stirrer, thermocouple, sparging tube, and dropping funnel 55.5 g (0.75 eq) of n-butanol and 63 g (0.75 eq) of HDI were heated to 90° C. and were kept at that temperature until the urethanization reaction was complete. 1823.1 g (13.92 eq) of HMDI was then added and the heat was reduced to 70° C. Under a nitrogen sparge 5 g of a 10% catalyst solution of trimethylbenzyl-ammonium hydroxide (273 ppm) in xylene was added under stirring. The reaction was stopped with 5 g of a 20% solution of dibutylphosphate in HDI. The allophanatization/trimerization reaction was stopped at 36.8% conversion of the isocyanate groups. The crude product had an NCO content of 23.64% and a viscosity of 2100 cps at 25° C.

Excess HMDI monomer was removed from the previous preparation via thin film evaporation at 220° C. and 80 mTorr. The resulting product, which was reduced to 70% solids in Aromatic 100 solvent, had a viscosity of 1600 cps at 25° C., an NCO content of 7.67% and a monomer content of 0.30%.

Thermal Stability

Sample vials of the polyisocyanates from Example 1 and 2 were placed in an oven at 200° C. and removed at 5, 10, 20, 30, 45, and 60 min. Analysis was done for monomer content (HPLC and GPC), viscosity, color, NCO content and GPC. All analyses were performed on the materials at 70% solids in Aromatic 100 solvent. The data for the tests are shown in Tables 1 and 2.

TABLE 1

| Polyisocyanate of Example 1 - Comparison | | | | | |
|---|---|---|---|---|---|
| Time (min) | Visc. (mPa · s) | % NCO | % HMDI (HPLC) | % HMDI (GPC) | Color (APHA) |
| 0 | 1647 | 8.86 | 0.35 | 0.33 | 100 |
| 5 | 1661 | 8.95 | 0.71 | 0.62 | 100 |
| 10 | 1686 | 9.35 | 1.1 | 0.94 | 100 |
| 20 | 1121 | 9.65 | 2.2 | 1.79 | 100 |
| 30 | 1475 | 9.86 | 4.0 | 3.17 | 100 |
| 45 | 883 | 9.84 | 5.3 | 4.26 | 100 |
| 60 | 468 | 10.58 | 7.5 | 6.25 | 100–150 |

TABLE 2

| Polyisocyanate of Example 2 - According to the invention | | | | | |
|---|---|---|---|---|---|
| Time (min) | Visc. (mPa · s) | % NCO | % HMDI (HPLC) | % HMDI (GPC) | Color (APHA) |
| 0 | 1651 | 7.46 | 0.27 | 0.35 | 150 |
| 5 | 1524 | 8.12 | 0.69 | 0.63 | 100–150 |
| 10 | 1465 | 7.95 | 1.1 | 1.1 | 100–150 |
| 20 | 1427 | 8.23 | 2.1 | 1.99 | 100 |
| 30 | 1009 | 8.61 | 3.2 | 2.78 | 70–100 |
| 45 | 1398 | 8.79 | 4.3 | 3.7 | 70–100 |
| 60 | 1292 | 9.41 | 5.5 | 4.92 | 70–100 |

The increase in NCO content indicates that HMDI monomer is being regenerated by the thermal breakdown of the allophanate group. The breakdown of allophanate is slower in the case of the invention as indicated in the slower increase in % HMDI as measured by HPLC and GPC. As monomer is generated the viscosity decreases. The viscosity is much more stable for the polyisocyanate prepared in accordance with the present invention. The APHA color is reasonably constant for each example over the test series.

Film Formation

The following tests compare film properties obtained from coating compositions prepared from the polyisocyanate of claim 2 and a commercially available polyisocyanate (the isocyanurate of isophorone diisocyanate, Desmodur Z-4370, available from Bayer). These polyisocyanates were combined with an acrylic polyol (Desmophen A-565, available from Bayer) at an NCO/OH equivalent ratio of 1:1 to form the coating compositions. The coating compositions were present at solids in a 1:1 blend of methyl ethyl ketone/propylene glycol monomethyl ether acetate. Films were applied by a 6 mil draw down bar onto Bonderite 1000 cold rolled steel panels and cured at 120° C. for 40 min. Viscosity was measured on a Brookfield viscometer.

| Polyiso | Viscosity | Hardness (sec) | Impact (F/R) | MEK dbl rubs |
|---|---|---|---|---|
| IPDI Trimer | 335 cps (#2, 30 rpm) | 195 sec | 50/10 | >200 |
| Ex. 2 | 195 cps (#2, 60 rpm) | 165 sec | 160/160 | >200 |

The coating compositions prepared from the polyisocyanate of Example 2 had a much lower viscosity than compositions containing the commercially available IPDI trimer, and also resulted in coatings having slightly less hardness, substantially better flexibility and similar solvent resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate containing allophanate groups and optionally isocyanurate groups that is prepared by reacting a compound which i) is substantially free of hydroxyl groups and isocyanate groups, ii) has an average of at least two urethane groups per molecule and iii) is the reaction product of a linear or branched, aliphatic isocyanate with an organic hydroxyl compound, with an excess quantity, based on the urethane groups, of 4,4'-bis-(isocyanatocyclohexyl)-methane to form a polyisocyanate containing allophanate groups and optionally isocyanurate groups and optionally removing at least a portion of the unreacted excess 4,4'-bis-(isocyanatocyclohexyl)-methane.

2. The polyisocyanate of claim 1 wherein said isocyanate comprises a linear or branched, aliphatic diisocyanate and said alcohol comprises a monoalcohol.

3. The polyisocyanate of claim 1 wherein said isocyanate comprises 1,6-hexamethylene diisocyanate and said alcohol comprises a monoalcohol.

4. The polyisocyanate of claim 3 wherein said alcohol comprises a monoalcohol containing 1 to 10 carbon atoms.

5. A process for preparing a polyisocyanate containing allophanate groups by reacting a compound which i) is substantially free of hydroxyl groups and isocyanate groups, ii) has an average of at least two urethane groups per molecule and iii) is the reaction product of a linear or branched, aliphatic isocyanate with an organic hydroxyl compound, with an excess quantity, based on the urethane groups, of bis-(4-isocyanatocyclohexyl)-methane to form a polyisocyanate containing allophanate groups and optionally isocyanurate groups and optionally removing at least a portion of the unreacted excess bis-(4-isocyanatocyclohexyl)-methane.

6. The process of claim 5 wherein said isocyanate comprises a linear or branched, aliphatic diisocyanate and said alcohol comprises a monoalcohol.

7. The process of claim 5 wherein said isocyanate comprises 1,6-hexamethylene diisocyanate and said alcohol comprises a monoalcohol.

8. The process of claim 7 wherein said alcohol comprises a monoalcohol containing 1 to 10 carbon atoms.

9. A coating composition containing the polyisocyanate of claim 1 as the binder or a binder component.

10. A polyisocyanate containing allophanate groups and optionally isocyanurate groups that is prepared by reacting a compound which i) is substantially free of hydroxyl groups and isocyanate groups, ii) has an average of at least two urethane groups per molecule and iii) is the reaction product of a linear or branched, aliphatic isocyanate with an organic hydroxyl compound, with an excess quantity, based on the urethane groups, of 4,4'-bis-(isocyanatocyclohexyl)-methane to form a polyisocyanate containing allophanate groups and optionally isocyanurate groups and removing sufficient unreacted excess 4,4'-bis-(isocyanatocyclohexyl)-methane such that said polyisocyanate contains less than 2% by weight of this monomer.

11. The polyisocyanate of claim 10 wherein said isocyanate comprises a linear or branched, aliphatic diisocyanate and said alcohol comprises a monoalcohol.

12. The polyisocyanate of claim 10 wherein said isocyanate comprises 1,6-hexamethylene diisocyanate and said alcohol comprises a monoalcohol.

13. The polyisocyanate of claim 12 wherein said alcohol comprises a monoalcohol containing 1 to 10 carbon atoms.

14. A process for preparing a polyisocyanate containing allophanate groups by reacting a compound which i) is substantially free of hydroxyl groups and isocyanate groups, ii) has an average of at least two urethane groups per molecule and iii) is the reaction product of a linear or branched, aliphatic isocyanate with an organic hydroxyl compound, with an excess quantity, based on the urethane groups, of bis-(4-isocyanatocyclohexyl)-methane to form a polyisocyanate containing allophanate groups and optionally isocyanurate groups and removing sufficient unreacted excess bis-(4-isocyanato-cyclohexyl)-methane such that said polyisocyanate contains less than 2% by weight of this monomer.

15. The process of claim 14 wherein said isocyanate comprises a linear or branched, aliphatic diisocyanate and said alcohol comprises a monoalcohol.

16. The process of claim 14 wherein said isocyanate comprises 1,6-hexamethylene diisocyanate and said alcohol comprises a monoalcohol.

17. The process of claim 16 wherein said alcohol comprises a monoalcohol containing 1 to 10 carbon atoms.

* * * * *